United States Patent
Kim et al.

(10) Patent No.: US 10,387,752 B1
(45) Date of Patent: *Aug. 20, 2019

(54) LEARNING METHOD AND LEARNING DEVICE FOR OBJECT DETECTOR WITH HARDWARE OPTIMIZATION BASED ON CNN FOR DETECTION AT DISTANCE OR MILITARY PURPOSE USING IMAGE CONCATENATION, AND TESTING METHOD AND TESTING DEVICE USING THE SAME

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,279

(22) Filed: Jan. 22, 2019

(51) Int. Cl.
*G06K 9/46* (2006.01)
*G06K 9/62* (2006.01)
(Continued)

(52) U.S. Cl.
CPC ........ *G06K 9/6257* (2013.01); *G06K 9/4642* (2013.01); *G06K 9/6262* (2013.01); *G06N 3/04* (2013.01); *G06N 7/005* (2013.01)

(58) Field of Classification Search
CPC .. G06K 9/6257; G06K 9/4642; G06K 9/6262; G06N 3/04; G06N 7/005
See application file for complete search history.

(56) References Cited

U.S. PATENT DOCUMENTS 10,169,679 B1 * 1/2019 Kim ..................... G06K 9/6256
10,185,878 B2 * 1/2019 Liu .................... G06K 9/00369
(Continued)

OTHER PUBLICATIONS

Liu, J. , Wang, D. , Lu, L. , Wei, Z. , Kim, L. , Turkbey, E. B., Sahiner, B. , Petrick, N. A. and Summers, R. M. (2017), Detection and diagnosis of colitis on computed tomography using deep convolutional neural networks. Med. Phys., 44: 4630-4642. doi:10.1002/mp.12399 (Year: 2017).*

(Continued)

*Primary Examiner* — Utpal D Shah
(74) *Attorney, Agent, or Firm* — Husch Blackwell LLP

(57) ABSTRACT

A method for learning parameters of an object detector with hardware optimization based on a CNN for detection at distance or military purpose using an image concatenation is provided. The CNN can be redesigned when scales of objects change as a focal length or a resolution changes depending on the KPI. The method includes steps of: (a) concatenating n manipulated images which correspond to n target regions; (b) instructing an RPN to generate first to n-th object proposals in the n manipulated images by using an integrated feature map, and instructing a pooling layer to apply pooling operations to regions, corresponding to the first to the n-th object proposals, on the integrated feature map; and (c) instructing an FC loss layer to generate first to (Continued)

n-th FC losses by referring to the object detection information, outputted from an FC layer.

30 Claims, 6 Drawing Sheets
(1 of 6 Drawing Sheet(s) Filed in Color)

(51) Int. Cl.
*G06N 3/04* (2006.01)
*G06N 7/00* (2006.01)

(56) References Cited

U.S. PATENT DOCUMENTS

| | | | |
|---|---|---|---|
| 2016/0035078 A1* | 2/2016 | Lin | G06T 7/0002 |
| | | | 382/157 |
| 2017/0124415 A1* | 5/2017 | Choi | G06N 3/08 |
| 2017/0147905 A1* | 5/2017 | Huang | G06K 9/6232 |
| 2017/0220904 A1* | 8/2017 | Bai | G06K 9/4604 |
| 2018/0039853 A1* | 2/2018 | Liu | G06N 3/0454 |
| 2018/0039864 A1* | 2/2018 | Yao | G06K 9/38 |
| 2018/0068198 A1* | 3/2018 | Savvides | G06K 9/3233 |
| 2018/0096457 A1* | 4/2018 | Savvides | G06K 9/6267 |
| 2018/0129906 A1* | 5/2018 | Habibian | G06K 9/4628 |
| 2018/0137350 A1* | 5/2018 | Such | G06K 9/00463 |
| 2018/0158189 A1* | 6/2018 | Yedla | G06T 7/11 |
| 2018/0165551 A1* | 6/2018 | Roh | G06K 9/3233 |
| 2018/0195977 A1* | 7/2018 | Wang | G01V 5/0016 |
| 2018/0253622 A1* | 9/2018 | Chen | G06K 9/4671 |
| 2018/0260414 A1* | 9/2018 | Gordo Soldevila | |
| | | | G06N 3/0445 |
| 2018/0260415 A1* | 9/2018 | Gordo Soldevila | |
| | | | G06K 9/4628 |
| 2018/0276454 A1* | 9/2018 | Han | G06K 9/00255 |
| 2018/0315154 A1* | 11/2018 | Park | G06T 1/20 |
| 2019/0012802 A1* | 1/2019 | Liu | G06T 7/73 |
| 2019/0019037 A1* | 1/2019 | Kadav | G06K 9/00744 |
| 2019/0050694 A1* | 2/2019 | Fukagai | G06K 9/66 |
| 2019/0050728 A1* | 2/2019 | Sim | G06N 3/08 |
| 2019/0050994 A1* | 2/2019 | Fukagai | G06T 7/20 |
| 2019/0057507 A1* | 2/2019 | El-Khamy | G06T 7/11 |
| 2019/0065897 A1* | 2/2019 | Li | G06K 9/628 |

OTHER PUBLICATIONS

"Faster R-CNN: Towards Real-Time Object Detection with Region Proposal Networks", Ren, Shaoqing and He, Kaiming and Girshick, Ross and Sun, Jian, Advances in Neural Information Processing Systems 28, pp. 91-99, 2015. (Year: 2015).*

Xudong Sun, Pengcheng Wu, Steven C.H. Hoi, "Face detection using deep learning: An improved faster RCNN approach", Neurocomputing, vol. 299, 2018, pp. 42-50 (Year: 2018).*

* cited by examiner

LEARNING METHOD AND LEARNING DEVICE FOR OBJECT DETECTOR WITH HARDWARE OPTIMIZATION BASED ON CNN FOR DETECTION AT DISTANCE OR MILITARY PURPOSE USING IMAGE CONCATENATION, AND TESTING METHOD AND TESTING DEVICE USING THE SAME

FIELD OF THE DISCLOSURE

The present disclosure relates to a method for learning parameters of an object detector with hardware optimization based on a CNN for detection at distance or military purpose using an image concatenation; and more particularly, to the method including steps of: (a) if at least one training image is acquired, (i) instructing a target region estimating network to estimate a first target region to an n-th target region on the training image or its one or more resized images, wherein one or more corresponding target objects are estimated as located on each of the first target region to the n-th target region, (ii) instructing an image-manipulating network to generate a first manipulated image to an n-th manipulated image, from the training image or its resized images, each of which corresponds to each of the first target region to the n-th target region, and (iii) generating an integrated training image by concatenating the first manipulated image to the n-th manipulated image; (b) (i) instructing one or more convolutional layers to generate at least one integrated feature map by applying one or more convolution operations to the integrated training image, (ii) instructing an RPN to generate each of first object proposals to n-th object proposals, corresponding to one or more objects, in each of the first manipulated image to the n-th manipulated image by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the objects; and (c) instructing at least one FC loss layer to generate one or more first FC losses to one or more n-th FC losses by referring to the first object detection information to the n-th object detection information and their corresponding GTs, to thereby adjust at least part of parameters of the FC layer and the convolutional layers by backpropagating the first FC losses to the n-th FC losses, and a learning device, a testing method, and a testing device using the same.

BACKGROUND OF THE DISCLOSURE

In machine learning, a convolutional neural network (CNN, or ConvNet) is a class of deep, feed-forward artificial neural network that has successfully been applied to analyzing visual imagery.

A CNN-based object detector may (i) instruct one or more convolutional layers to apply convolution operations to an input image, to thereby generate a feature map corresponding to the input image, (ii) instruct an RPN (Region Proposal Network) to identify proposals corresponding to an object in the input image by using the feature map, (iii) instruct a pooling layer to apply at least one pooling operation to areas on the feature map corresponding to the identified proposals, to thereby generate one or more pooled feature maps, and (iv) instruct an FC (Fully Connected) layer to apply at least one fully connected operation to the acquired pooled feature maps to output class information and regression information for the object, to thereby detect the object on the input image.

However, since the CNN-based object detector uses the feature map whose size is reduced from a size of the input image by the convolutional layer, it is difficult to detect a small-sized object in the input image although a large-sized object in the input image can be easily detected.

That is, if there are multiple target regions corresponding to one or more objects as subjects to be detected in the input image, desired features may not be extracted accurately from some of target regions due to sizes thereof, and as a result, certain objects cannot be detected.

Such a problem may be resolved by object detection via cropping each of the target regions in each of the images among an image pyramid derived from the input image, but in this case, the object detection must be performed for each of the cropped images corresponding to the target regions, thus computational load may increase.

In addition to this, a CNN operation is a block operation, e.g., an operation by a unit of 32, 64, 128, etc., for fast calculation, but if an input image whose width or height is not a multiple of the unit is acquired, one or more padding regions must be added to make it be a multiple of the unit, but this becomes a burden to the CNN operation. As a result, the more there are cropped images whose width or height is not a multiple of the unit, the heavier the burden on the CNN, which slows down the calculation speed of the CNN.

Accordingly, the inventors of the present disclosure propose a learning method, a learning device for efficiently detecting objects and reducing computational time of the CNN, by using the target regions corresponding to the objects with various sizes in the input image, and a testing method and a testing device using the same.

SUMMARY OF THE DISCLOSURE

It is an object of the present disclosure to solve all the aforementioned problems.

It is another object of the present disclosure to provide an object detector based on a CNN capable of efficiently detecting objects on an image without regard to their sizes.

It is still another object of the present disclosure to provide the object detector based on the CNN capable of detecting the objects on the image without additional computational load.

It is still yet another object of the present disclosure to provide the object detector based on the CNN capable of efficiently detecting the objects and reducing computational time of the CNN, by using target regions corresponding to the objects with various sizes in the input image.

In accordance with one aspect of the present disclosure, there is provided a method for learning parameters of an object detector based on a CNN using an image concatenation, including steps of: (a) a learning device, if at least one training image is acquired, (i) instructing a target region estimating network to estimate a first target region to an n-th target region on the training image or its one or more resized images, wherein one or more corresponding target objects are estimated as located on each of the first target region to the n-th target region, (ii) instructing an image-manipulating network to generate a first manipulated image to an n-th manipulated image, from the training image or its resized images, each of which corresponds to each of the first target region to the n-th target region, and (iii) generating an integrated training image by concatenating the first manipulated image to the n-th manipulated image; (b) the learning device (i) instructing one or more convolutional layers to generate at least one integrated feature map by applying one or more convolution operations to the integrated training image, (ii) instructing an RPN to generate each of first object proposals to n-th object proposals, corresponding to one or more objects, in each of the first manipulated image to the n-th manipulated image by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the objects; and (c) the learning device instructing at least one FC loss layer to generate one or more first FC losses to one or more n-th FC losses by referring to the first object detection information to the n-th object detection information and their corresponding GTs, to thereby adjust at least part of parameters of the FC layer and the convolutional layers by backpropagating the first FC losses to the n-th FC losses.

As one example, after the step of (b), the learning device instructs at least one RPN loss layer to generate one or more first RPN losses to one or more n-th RPN losses by referring to the first object proposals to the n-th object proposals and their corresponding GTs, to thereby adjust at least part of parameters of the RPN by backpropagating the first RPN losses to the n-th RPN losses.

As one example, at the step of (a), the learning device instructs the image-manipulating network to adjust at least one of widths and lengths of the first manipulated image to the n-th manipulated image to be identical, and concatenates the first adjusted manipulated image to the n-th adjusted manipulated image in a direction of the widths or the lengths which are adjusted to be identical.

As one example, the learning device instructs the image-manipulating network to add at least one zero padding region in-between each pair comprised of two neighboring adjusted manipulated images which are concatenated, among the first adjusted manipulated image to the n-th adjusted manipulated image.

As one example, the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as $$S \times \frac{(K-1)}{2}.$$

As one example, at the step of (a), the learning device instructs the target region estimating network to calculate each scale histogram for each of the training image or its resized images and estimate the first target region to the n-th target region corresponding to scale proposals where the corresponding target objects are estimated as located, by referring to the scale histogram.

As one example, at the step of (a), the learning device instructs the image-manipulating network to generate the first manipulated image to the n-th manipulated image by cropping one or more regions corresponding to the first target region to the n-th target region on the training image or its resized images, or instructs the image-manipulating network to generate the first manipulated image to the n-th manipulated image by cropping and resizing one or more regions corresponding to the first target region to the n-th target region on the training image or its resized images.

As one example, the first target region to the n-th target region correspond to multiple different target objects among the target objects in the training image, or correspond to at least one identical target object in the training image and its resized images.

In accordance with another aspect of the present disclosure, there is provided a method for testing an object detector based on a CNN using an image concatenation, including steps of: (a) on condition that a learning device (1) (i) has instructed a target region estimating network to estimate a first target region for training to an n-th target region for training on at least one training image or its one or more resized images for training, wherein one or more corresponding target objects for training are estimated as located on each of the first target region for training to the n-th target region for training, (ii) has instructed an image-manipulating network to generate a first manipulated image for training to an n-th manipulated image for training, from the training image or its resized images for training, each of which corresponds to each of the first target region for training to the n-th target region for training, and (iii) has generated an integrated training image by concatenating the first manipulated image for training to the n-th manipulated image for training, (2) (i) has instructed one or more convolutional layers to generate at least one integrated feature map for training by applying one or more convolution operations to the integrated training image, (ii) has instructed an RPN to generate each of first object proposals for training to n-th object proposals for training, corresponding to one or more objects for training, in each of the first manipulated image for training to the n-th manipulated image for training by using the integrated feature map for training, (iii) has instructed a pooling layer to apply one or more pooling operations to each region, corresponding to each of the first object proposals for training to the n-th object proposals for training, on the integrated feature map for training, to thereby generate at least one pooled integrated feature map for training, and (iv) has instructed an FC layer to apply at least one fully connected operation to the pooled integrated feature map for training, to thereby generate first object detection information for training to n-th object detection information for training corresponding to the objects for training, and (3) has instructed at least one FC loss layer to generate one or more first FC losses to one or more n-th FC losses by referring to the first object detection information for training to the n-th object detection information for training and their corresponding GTs, to thereby adjust at least part of parameters of the FC layer and the convolutional layers by backpropagating the first FC losses to the n-th FC losses; a testing device, if at least one test image is acquired, (i) instructing the target region estimating network to estimate a first target region for testing to an n-th target region for testing on the test image or its one or more resized images for testing, wherein one or more corresponding target objects for testing are estimated as located on each of the first target region for testing to the n-th target region for testing, (ii) instructing the image-manipulating network to generate a first manipulated image for testing to an n-th manipulated image for testing, from the test image or its resized images for testing, each of which corresponds to each of the first target region for testing to the n-th target region for testing, and (iii) generating an integrated test image by concatenating the first manipulated image for testing to the n-th manipulated image for testing; and (b) the testing device (i) instructing the convolutional layers to generate at least one integrated feature map for testing by applying the convolution operations to the integrated test image, (ii) instructing the RPN to generate each of first object proposals for testing to n-th object proposals for testing, corresponding to one or more objects for testing, in each of the first manipulated image for testing to the n-th manipulated image for testing by using the integrated feature map for testing, (iii) instructing the pooling layer to apply the pooling operations to each region, corresponding to each of the first object proposals for testing to the n-th object proposals for testing, on the integrated feature map for testing, to thereby generate at least one pooled integrated feature map for testing, and (iv) instructing the FC layer to apply the fully connected operation to the pooled integrated feature map for testing, to thereby generate first object detection information for testing to n-th object detection information for testing corresponding to the objects for testing.

As one example, at the step of (a), the testing device instructs the image-manipulating network to adjust at least one of widths and lengths of the first manipulated image for testing to the n-th manipulated image for testing to be identical, and concatenates the first adjusted manipulated image for testing to the n-th adjusted manipulated image for testing in a direction of the widths or the lengths which are adjusted to be identical.

As one example, the testing device instructs the image-manipulating network to add at least one zero padding region in-between each pair comprised of two neighboring adjusted manipulated images for testing which are concatenated, among the first adjusted manipulated image for testing to the n-th adjusted manipulated image for testing.

As one example, the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as $$S \times \frac{(K-1)}{2}.$$

As one example, at the step of (a), the testing device instructs the target region estimating network to calculate each scale histogram for testing for each of the test image or its resized images for testing and estimate the first target region for testing to the n-th target region for testing corresponding to scale proposals where the corresponding target objects for testing are estimated as located, by referring to the scale histogram for testing.

As one example, at the step of (a), the testing device instructs the image-manipulating network to generate the first manipulated image for testing to the n-th manipulated image for testing by cropping one or more regions corresponding to the first target region for testing to the n-th target region for testing on the test image or its resized images for testing, or instructs the image-manipulating network to generate the first manipulated image for testing to the n-th manipulated image for testing by cropping and resizing one or more regions corresponding to the first target region for testing to the n-th target region for testing on the test image or its resized images for testing.

As one example, the first target region for testing to the n-th target region for testing correspond to multiple different target objects for testing among the target objects for testing in the test image, or correspond to at least one identical target object for testing in the test image and its resized images for testing.

In accordance with still another aspect of the present disclosure, there is provided a learning device for learning parameters of an object detector based on a CNN using an image concatenation, including: at least one memory that stores instructions; and at least one processor configured to execute the instructions to: perform processes of (I) (i) instructing a target region estimating network to estimate a first target region to an n-th target region on at least one training image or its one or more resized images, wherein one or more corresponding target objects are estimated as located on each of the first target region to the n-th target region, (ii) instructing an image-manipulating network to generate a first manipulated image to an n-th manipulated image, from the training image or its resized images, each of which corresponds to each of the first target region to the n-th target region, and (iii) generating an integrated training image by concatenating the first manipulated image to the n-th manipulated image, (II) (i) instructing one or more convolutional layers to generate at least one integrated feature map by applying one or more convolution operations to the integrated training image, (ii) instructing an RPN to generate each of first object proposals to n-th object proposals, corresponding to one or more objects, in each of the first manipulated image to the n-th manipulated image by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the objects, and (III) instructing at least one FC loss layer to generate one or more first FC losses to one or more n-th FC losses by referring to the first object detection information to the n-th object detection information and their corresponding GTs, to thereby adjust at least part of parameters of the FC layer and the convolutional layers by backpropagating the first FC losses to the n-th FC losses.

As one example, after the process of (II), the processor instructs at least one RPN loss layer to generate one or more first RPN losses to one or more n-th RPN losses by referring to the first object proposals to the n-th object proposals and their corresponding GTs, to thereby adjust at least part of parameters of the RPN by backpropagating the first RPN losses to the n-th RPN losses.

As one example, at the process of (I), the processor instructs the image-manipulating network to adjust at least one of widths and lengths of the first manipulated image to the n-th manipulated image to be identical, and concatenates the first adjusted manipulated image to the n-th adjusted manipulated image in a direction of the widths or the lengths which are adjusted to be identical.

As one example, the processor instructs the image-manipulating network to add at least one zero padding region in-between each pair comprised of two neighboring adjusted manipulated images which are concatenated, among the first adjusted manipulated image to the n-th adjusted manipulated image.

As one example, the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as $$S \times \frac{(K-1)}{2}.$$

As one example, at the process of (I), the processor instructs the target region estimating network to calculate each scale histogram for each of the training image or its resized images and estimate the first target region to the n-th target region corresponding to scale proposals where the corresponding target objects are estimated as located, by referring to the scale histogram.

As one example, at the process of (I), the processor instructs the image-manipulating network to generate the first manipulated image to the n-th manipulated image by cropping one or more regions corresponding to the first target region to the n-th target region on the training image or its resized images, or instructs the image-manipulating network to generate the first manipulated image to the n-th manipulated image by cropping and resizing one or more regions corresponding to the first target region to the n-th target region on the training image or its resized images.

As one example, the first target region to the n-th target region correspond to multiple different target objects among the target objects in the training image, or correspond to at least one identical target object in the training image and its resized images.

In accordance with still yet another aspect of the present disclosure, there is provided a testing device for testing an object detector based on a CNN using an image concatenation, including: at least one memory that stores instructions; and at least one processor, on condition that a learning device (1) (i) has instructed a target region estimating network to estimate a first target region for training to an n-th target region for training on at least one training image or its one or more resized images for training, wherein one or more corresponding target objects for training are estimated as located on each of the first target region for training to the n-th target region for training, (ii) has instructed an image-manipulating network to generate a first manipulated image for training to an n-th manipulated image for training, from the training image or its resized images for training, each of which corresponds to each of the first target region for training to the n-th target region for training, and (iii) has generated an integrated training image by concatenating the first manipulated image for training to the n-th manipulated image for training, (2) (i) has instructed one or more convolutional layers to generate at least one integrated feature map for training by applying one or more convolution operations to the integrated training image, (ii) has instructed an RPN to generate each of first object proposals for training to n-th object proposals for training, corresponding to one or more objects for training, in each of the first manipulated image for training to the n-th manipulated image for training by using the integrated feature map for training, (iii) has instructed a pooling layer to apply one or more pooling operations to each region, corresponding to each of the first object proposals for training to the n-th object proposals for training, on the integrated feature map for training, to thereby generate at least one pooled integrated feature map for training, and (iv) has instructed an FC layer to apply at least one fully connected operation to the pooled integrated feature map for training, to thereby generate first object detection information for training to n-th object detection information for training corresponding to the objects for training, and (3) has instructed at least one FC loss layer to generate one or more first FC losses to one or more n-th FC losses by referring to the first object detection information for training to the n-th object detection information for training and their corresponding GTs, to thereby adjust at least part of parameters of the FC layer and the convolutional layers by backpropagating the first FC losses to the n-th FC losses; configured to execute the instructions to: perform processes of (I) (i) instructing the target region estimating network to estimate a first target region for testing to an n-th target region for testing on at least one test image or its one or more resized images for testing, wherein one or more corresponding target objects for testing are estimated as located on each of the first target region for testing to the n-th target region for testing, (ii) instructing the image-manipulating network to generate a first manipulated image for testing to an n-th manipulated image for testing, from the test image or its resized images for testing, each of which corresponds to each of the first target region for testing to the n-th target region for testing, and (iii) generating an integrated test image by concatenating the first manipulated image for testing to the n-th manipulated image for testing, and (II) (i) instructing the convolutional layers to generate at least one integrated feature map for testing by applying the convolution operations to the integrated test image, (ii) instructing the RPN to generate each of first object proposals for testing to n-th object proposals for testing, corresponding to one or more objects for testing, in each of the first manipulated image for testing to the n-th manipulated image for testing by using the integrated feature map for testing, (iii) instructing the pooling layer to apply the pooling operations to each region, corresponding to each of the first object proposals for testing to the n-th object proposals for testing, on the integrated feature map for testing, to thereby generate at least one pooled integrated feature map for testing, and (iv) instructing the FC layer to apply the fully connected operation to the pooled integrated feature map for testing, to thereby generate first object detection information for testing to n-th object detection information for testing corresponding to the objects for testing.

As one example, at the process of (I), the processor instructs the image-manipulating network to adjust at least one of widths and lengths of the first manipulated image for testing to the n-th manipulated image for testing to be identical, and concatenates the first adjusted manipulated image for testing to the n-th adjusted manipulated image for testing in a direction of the widths or the lengths which are adjusted to be identical.

As one example, the processor instructs the image-manipulating network to add at least one zero padding region in-between each pair comprised of two neighboring adjusted manipulated images for testing which are concatenated, among the first adjusted manipulated image for testing to the n-th adjusted manipulated image for testing.

As one example, the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as $$S \times \frac{(K-1)}{2}.$$

As one example, at the process of (I), the processor instructs the target region estimating network to calculate each scale histogram for testing for each of the test image or its resized images for testing and estimate the first target region for testing to the n-th target region for testing corresponding to scale proposals where the corresponding target objects for testing are estimated as located, by referring to the scale histogram for testing.

As one example, at the process of (I), the processor instructs the image-manipulating network to generate the first manipulated image for testing to the n-th manipulated image for testing by cropping one or more regions corresponding to the first target region for testing to the n-th target region for testing on the test image or its resized images for testing, or instructs the image-manipulating network to generate the first manipulated image for testing to the n-th manipulated image for testing by cropping and resizing one or more regions corresponding to the first target region for testing to the n-th target region for testing on the test image or its resized images for testing.

As one example, the first target region for testing to the n-th target region for testing correspond to multiple different target objects for testing among the target objects for testing in the test image, or correspond to at least one identical target object for testing in the test image and its resized images for testing.

In addition, recordable media that are readable by a computer for storing a computer program to execute the method of the present disclosure is further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

Figure 1:
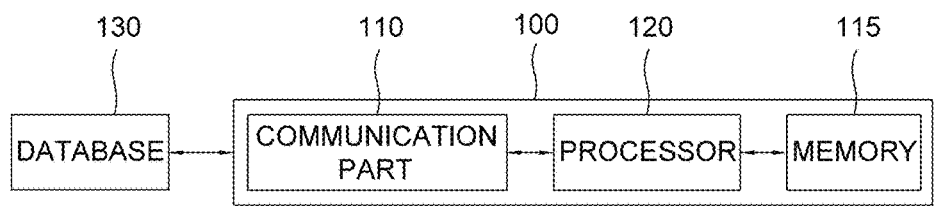

FIG. 1 is a drawing schematically illustrating a learning device for learning an object detector based on a CNN using an image concatenation in accordance with one example embodiment of the present disclosure.

Figure 2:
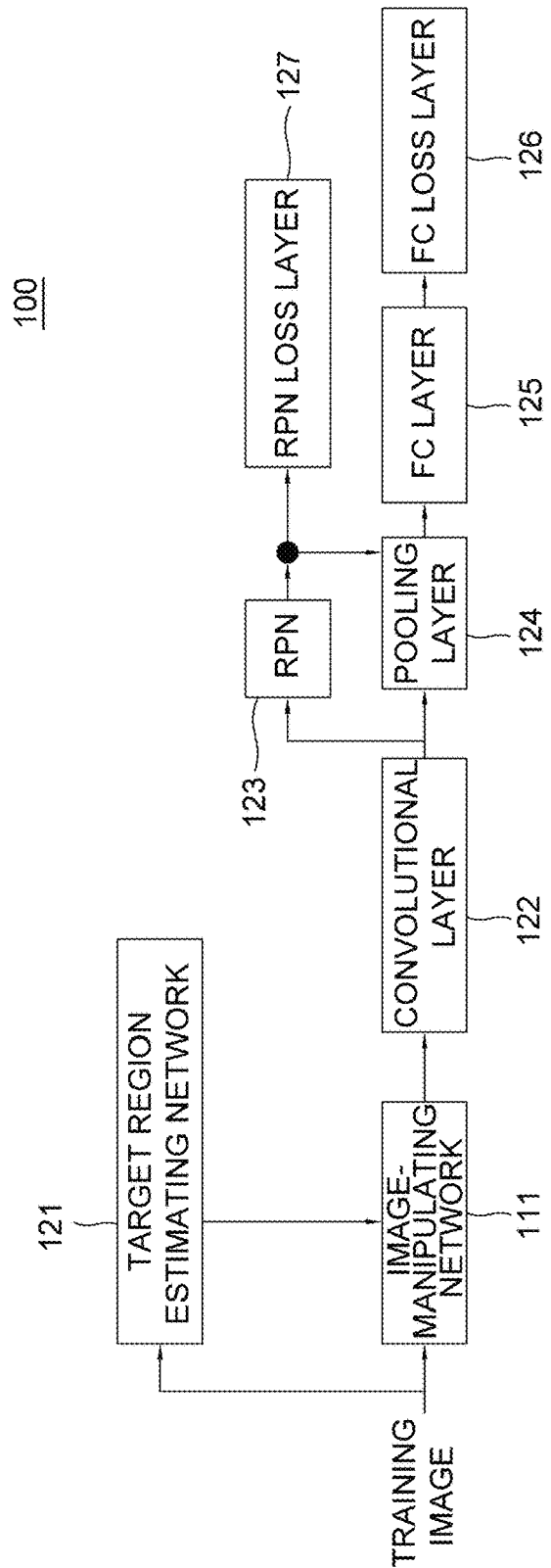

FIG. 2 is a drawing schematically illustrating a learning method for learning the object detector based on the CNN using the image concatenation in accordance with one example embodiment of the present disclosure.

Figure 3:
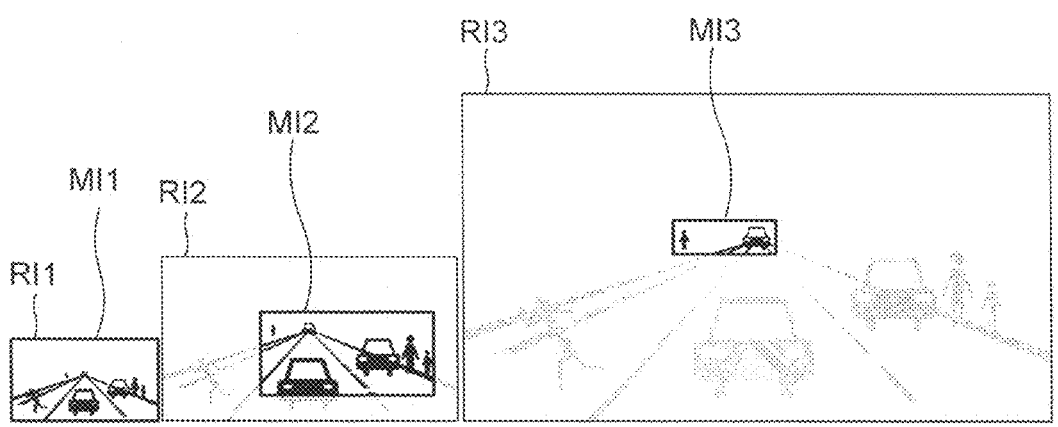

FIG. 3 is a drawing schematically illustrating a process of estimating each of target regions among an image pyramid, to be used for learning the object detector based on the CNN using the image concatenation in accordance with one example embodiment of the present disclosure.

Figure 4:
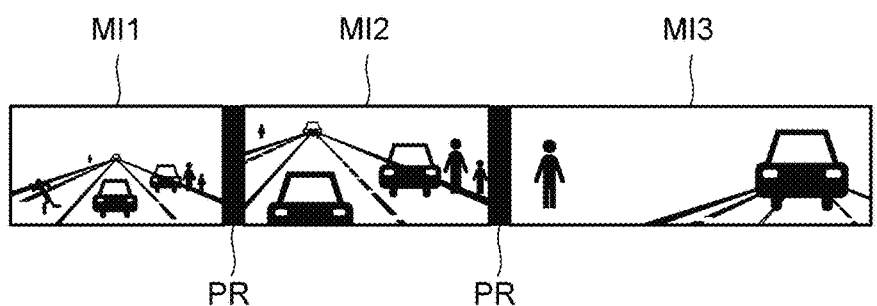

FIG. 4 is a drawing schematically illustrating a concatenation of manipulated images corresponding to each of the target regions to be used for learning the object detector based on the CNN using the image concatenation in accordance with one example embodiment of the present disclosure.

Figure 5:
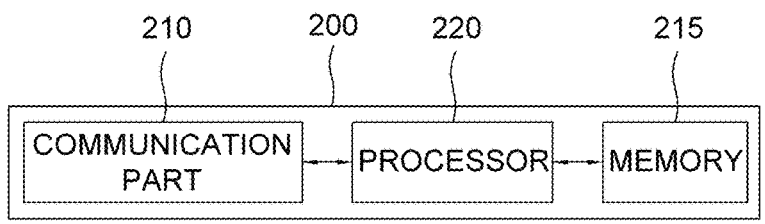

FIG. 5 is a drawing schematically illustrating a testing device for learning the object detector based on the CNN using the image concatenation in accordance with one example embodiment of the present disclosure.

Figure 6:
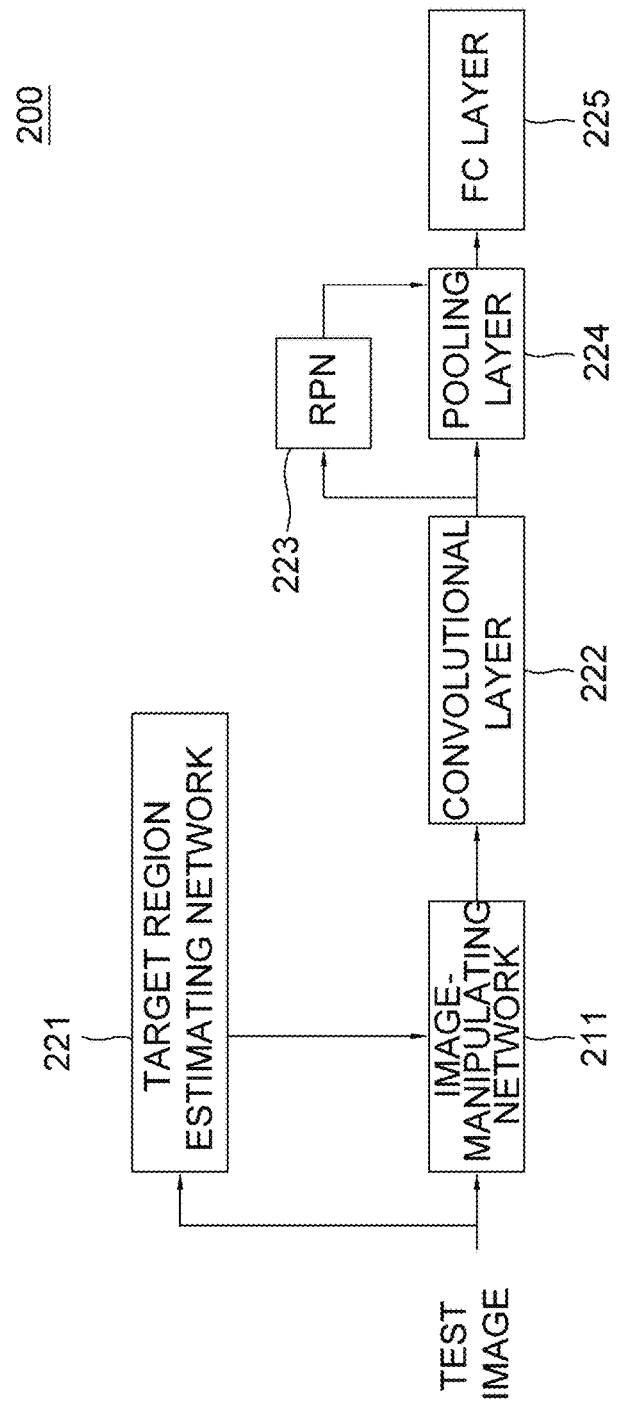

FIG. 6 is a drawing schematically illustrating a testing method for learning the object detector based on the CNN using the image concatenation in accordance with one example embodiment of the present disclosure.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device for learning an object detector based on a CNN using an image concatenation in accordance with one example embodiment of the present disclosure, and by referring to FIG. 1, the learning device 100 may include a communication part 110 and a processor 120.

First, the communication part 110 may acquire or support another device to acquire at least one training image.

Herein, the training image may be stored in a database 130, and the database 130 may store at least one ground truth, i.e., GT, of class information and location information on each of one or more objects in the training image. Additionally, the database 130 may store at least one ground truth of class information on each of the objects and location information on each of the objects located in resized images which are generated by resizing the training image.

In addition, the learning device may further include a memory 115 capable of storing computer readable instructions for performing following processes. As one example, the processor, the memory, a medium, etc. may be integrated with an integrated processor.

Next, the processor 120 may (i) instruct a target region estimating network to estimate a first target region to an n-th target region on the training image or its one or more resized images, where one or more corresponding target objects are estimated as located on each of the first target region to the n-th target region, (ii) instruct an image-manipulating network to generate a first manipulated image to an n-th manipulated image, from the training image or its resized images, each of which corresponds to each of the first target region to the n-th target region, and (iii) generate an integrated training image by concatenating the first manipulated image to the n-th manipulated image. Then, the processor 120 may (i) instruct one or more convolutional layers to generate at least one integrated feature map by applying one or more convolution operations to the integrated training image, (ii) instruct an RPN to generate each of first object proposals to n-th object proposals, corresponding to the objects, in each of the first manipulated image to the n-th manipulated image by using the integrated feature map, (iii) instruct a pooling layer to apply one or more pooling operations to each region, corresponding to each of the first object proposals to the n-th object proposals, on the integrated feature map, to thereby generate at least one pooled integrated feature map, and (iv) instruct an FC layer to apply at least one fully connected operation to the pooled integrated feature map, to thereby generate first object detection information to n-th object detection information corresponding to the objects. Thereafter, the processor 120 may instruct at least one FC loss layer to generate one or more first FC losses to one or more n-th FC losses by referring to the first object detection information to the n-th object detection information and their corresponding GTs, to thereby adjust at least part of parameters of the FC layer and the convolutional layers by backpropagating the first FC losses to the n-th FC losses.

Further, the processor 120 may instruct at least one RPN loss layer to generate one or more first RPN losses to one or more n-th RPN losses by referring to the first object proposals to the n-th object proposals and their corresponding GTs, to thereby adjust at least part of parameters of the RPN by backpropagating the first RPN losses to the n-th RPN losses.

Herein, the learning device 100 in accordance with one example of the present disclosure may be a computing device and may be any digital device with a processor capable of computation. For reference, although FIG. 1 shows the single learning device 100, the scope of the present disclosure is not limited thereto. For example, the learning device may be configured as several devices to perform its functions.

A method for learning parameters of the object detector based on the CNN using the image concatenation by using the learning device 100 in accordance with one example embodiment of the present disclosure is described by referring to FIG. 2 as follows.

First, if the training image is acquired, the learning device 100 may instruct a target region estimating network 121 to estimate the first target region to the n-th target region, corresponding to at least one area where at least one target object is estimated as located, on the training image or its resized images.

Herein, the first target region to the n-th target region may correspond to multiple different target objects among the target objects in a same image, or correspond to at least one identical target object in multiple images with different sizes. Also, the first target region to the n-th target region may correspond to target objects estimated as located in each of images among the image pyramid including different sizes of a same image.

That is, the target region estimating network 121 may search for the first target region to the n-th target region, corresponding to areas where a first target object to, an n-th target object are estimated as located, on the training image, or may search for each of the first target region to the n-th target region, corresponding to areas where at least one specific target object is estimated as located, on each of a first resized image to an n-th resized image which are derived from the training image.

Also, the target region estimating network 121 may search for a specific target region, corresponding to a specific area where a single target object is estimated as located, on the training image, and may search for each of the first target region to the n-th target region, corresponding to the specific area where the single target object is estimated as located, on each of the first resized image to the n-th resized image which are derived from the training image. Additionally, if there are multiple target objects on the training image, the target regions corresponding to the target objects may be estimated for each of the resized images.

In the meantime, the target region estimating network 121 may calculate each scale histogram for each of the training image or its resized images and estimate the first target region to the n-th target region corresponding to scale proposals where the corresponding target objects are estimated as located, by referring to the scale histogram.

Also, the target region estimating network 121 may perform segmentation on each of the training image or its resized images, may set seeds to search for the target regions based on the segmentation, and may set the target regions by referring to integrated regions into which small target regions are repeatedly integrated.

Additionally, the target region estimating network 121 may identify foregrounds on an image by a foreground segmentation and may set at least one area, where at least one target object is estimated as located and whose size is estimated as including the at least one target object, as at least one target region by referring to the identified foregrounds.

Further, the target region estimating network 121 may use a saliency detection method for setting one or more target regions.

However, the scope of the present disclosure is not limited thereto, and any method of searching for the target regions where the target objects are estimated as located on the image may be utilized.

Next, the learning device 100 may instruct an image-manipulating network 111 to generate a first manipulated image to an n-th manipulated image, corresponding to the first target region to the n-th target region, on the training image or each of its resized images each of which corresponds to each of the first target region to the n-th target region set by the target region estimating network 121.

Herein, the learning device 100 may instruct the image-manipulating network 111 to generate the first manipulated image to the n-th manipulated image by cropping one or more regions corresponding to the first target region to the n-th target region on the training image or its resized images, or may instruct the image-manipulating network 111 to generate the first manipulated image to the n-th manipulated image by cropping and resizing one or more regions corresponding to the first target region to the n-th target region on the training image or its resized images.

As one example, by referring to FIG. 3, the first resized image RI1 including the first target region may be considered as the first manipulated image MI1. The second manipulated image MI2, corresponding to the second target region, may be generated from the second resized image RI2, and the third manipulated image MI3, corresponding to the third target region, may be generated from the third resized image RI3.

Then, the learning device 100 may instruct the image-manipulating network 111 to generate the integrated training image by concatenating the first manipulated image to the third manipulated image.

Herein, the learning device 100 may instruct the image-manipulating network 111 to adjust at least one of widths and lengths of the first manipulated image to the third manipulated image to be identical, and concatenate the first adjusted manipulated image to the third adjusted manipulated image in a direction of the widths or the lengths which are adjusted to be identical.

Then, the learning device 100 may instruct the image-manipulating network 111 to add at least one zero padding region in-between each pair comprised of two neighboring adjusted manipulated images which are concatenated, among the first adjusted manipulated image to the third adjusted manipulated image. Herein, the integrated training image may be reduced by a ratio of 1/S by multiple convolution operations of the convolutional layers, and if a maximum size of each kernel of each of the convolutional layers is K×K, a distance in-between said each pair of the two neighboring adjusted manipulated images may be determined as $$S \times \frac{(K-1)}{2}.$$

As a result, an overhead to the CNN may be minimized.

As one example, by referring to FIG. 4, a height of the first manipulated image MI1, that of the second manipulated image MI2, and that of the third manipulated image MI3 generated by processes shown in FIG. 3 may be adjusted to be identical with each other and these manipulated images may be concatenated. Herein, each zero padding region PR may be added between each of the neighboring manipulated images. As another example, widths of the manipulated images may be adjusted to be identical and then each of the manipulated images may be concatenated by using the adjusted widths, or the widths and the heights are adjusted to be identical and then each of the manipulated images may be concatenated into a large squared shape.

Next, the learning device 100 may instruct a convolutional layer 122 to apply the convolution operations to the integrated training image, to thereby generate at least one integrated feature map. Herein, the convolutional layer 122 may be a single convolutional layer or multiple convolutional layers.

Then, the learning device 100 may instruct an RPN 123 to generate one or more first object proposals to one or more n-th object proposals corresponding to the objects in the first manipulated image to the n-th manipulated image included in the integrated training image by using the integrated feature map.

Herein, each of the first object proposals to the n-th object proposals may correspond to each of the objects in the first manipulated image to the n-th manipulated image, and each of the object proposals may include information on each proposal box having location information corresponding to each of the objects, i.e., a tagged area and information on whether it is an object. Herein, the information on whether it is an object may include probability information by which said each object proposal is estimated as an object, and information on the proposal box may include probability information by which the proposal box is estimated as matching the location of the object.

Then, the learning device 100 may instruct a pooling layer 124 to apply the pooling operations to each region, corresponding to each of the first object proposals to the n-th object proposals, on the integrated feature map, to thereby generate at least one pooled integrated feature map, and may instruct an FC layer 125 to apply the fully connected operation to the pooled integrated feature map, to thereby generate first object detection information to n-th object detection information corresponding to the objects.

Herein, the first object detection information to the n-th object detection information may include class information on each of the objects corresponding to the first object proposals to the n-th object proposals and information on bounding boxes, i.e., location information on each of the objects. Also, the class information may include probability information by which each of the objects is estimated as each class, and the information on the bounding boxes may include probability information by which each of the bounding boxes is estimated as matching the location of the object.

Thereafter, the learning device 100 may instruct at least one FC loss layer 126 to generate one or more first FC losses to one or more n-th FC losses by referring to the first object detection information to the n-th object detection information and their corresponding GTs, to thereby adjust at least part of parameters of the FC layer 125 and the convolutional layer 122 by backpropagating the first FC losses to the n-th FC losses.

Further, the learning device 100 may instruct at least one RPN loss layer 127 to generate one or more first RPN losses to one or more n-th RPN losses by referring to the first object proposals to the n-th object proposals and their corresponding GTs, to thereby adjust at least part of parameters of the RPN 123 by backpropagating the first RPN losses to the n-th RPN losses.

By using the method above, the objects with various sizes on the training image, especially the objects in the long distance which are small-sized, are detected efficiently. Also, computational load is reduced since only regions corresponding to the target regions are used, and thus computing time of the object detector based on the CNN is reduced.

Also, in the description so far, it is assumed that there is just one target object on the training image, however, in case there are multiple target objects on the training image, detection of each of the target objects is possible by using each target region corresponding to each of the target objects on the training image as in the method mentioned above.

FIG. 5 is a drawing schematically illustrating a testing device for testing the object detector based on the CNN using the image concatenation in accordance with one example embodiment of the present disclosure, and by referring to FIG. 5, the testing device 200 may include a communication part 210 and a processor 220.

First, the communication part 210 may acquire or support another device to acquire at least one test image.

In addition, the learning device may further include a memory 215 capable of storing computer readable instructions for performing following processes. As one example, the processor, the memory, a medium, etc. may be integrated with an integrated processor.

Herein, the object detector based on the CNN using the image concatenation may have been learned by the learning method described by referring to FIGS. 1 to 4.

For reference, in the description below, the phrase "for training" is added for terms related to the learning process and the phrase "for testing" is added for terms related to the testing process, to avoid possible confusion.

That is, if at least one training image has been acquired, the learning device may have performed processes of (a) (i) instructing the target region estimating network to estimate a first target region for training to an n-th target region for training on the training image or its one or more resized images, where one or more corresponding target objects for training are estimated as located on each of the first target region for training to the n-th target region for training, (ii) instructing the image-manipulating network to generate a first manipulated image for training to an n-th manipulated image for training, from the training image or its resized images, each of which corresponds to each of the first target region for training to the n-th target region for training, and (iii) generating an integrated training image by concatenating the first manipulated image for training to the n-th manipulated image for training; (b) (i) instructing the convolutional layers to generate at least one integrated feature map for training by applying the convolution operations to the integrated training image, (ii) instructing the RPN to generate each of first object proposals for training to n-th object proposals for training, corresponding to one or more objects for training, in each of the first manipulated image for training to the n-th manipulated image for training by using the integrated feature map for training, (iii) instructing the pooling layer to apply the pooling operations to each region, corresponding to each of the first object proposals for training to the n-th object proposals for training, on the integrated feature map for training, to thereby generate at least one pooled integrated feature map for training, and (iv) instructing the FC layer to apply the fully connected operation to the pooled integrated feature map for training, to thereby generate first object detection information for training to n-th object detection information for training corresponding to the objects for training; and (c) instructing the FC loss layer to calculate one or more first FC losses to one or more n-th FC losses by referring to the first object detection information for training to the n-th object detection information for training and their corresponding GTs, to thereby adjust at least part of parameters of the FC layer and the convolutional layers by backpropagating the first FC losses to the n-th FC losses.

Further, the learning device may have instructed the RPN loss layer to generate one or more first RPN losses to one or more n-th RPN losses by referring to the first object proposals for training to the n-th object proposals for training and their corresponding GTs, to thereby adjust at least part of parameters of the RPN by backpropagating the first RPN losses to the n-th RPN losses.

Next, the processor 220 may (i) instruct the target region estimating network to estimate a first target region for testing to an n-th target region for testing on at least one test image or its one or more resized images, where one or more corresponding target objects for testing are estimated as located on each of the first target region for testing to the n-th target region for testing, (ii) instruct the image-manipulating network to generate a first manipulated image for testing to an n-th manipulated image for testing, from the test image or its resized images, each of which corresponds to each of the first target region for testing to the n-th target region for testing, and (iii) generate an integrated test image by concatenating the first manipulated image for testing to the n-th manipulated image for testing. Then, the processor 220 may (i) instruct the convolutional layers to generate at least one integrated feature map for testing by applying the convolution operations to the integrated test image, (ii) instruct the RPN to generate each of first object proposals for testing to n-th object proposals for testing, corresponding to one or more objects for testing, in each of the first manipulated image for testing to the n-th manipulated image for testing by using the integrated feature map for testing, (iii) instruct the pooling layer to apply the pooling operations to each region, corresponding to each of the first object proposals for testing to the n-th object proposals for testing, on the integrated feature map for testing, to thereby generate at least one pooled integrated feature map for testing, and (iv) instruct the FC layer to apply the fully connected operation to the pooled integrated feature map for testing, to thereby generate first object detection information for testing to n-th object detection information for testing corresponding to the objects for testing.

Herein, the testing device 200 in accordance with one example embodiment of the present disclosure may be a computing device and may be any device with a processor capable of computation. For reference, although FIG. 6 shows the single testing device 200, the scope of the present disclosure is not limited thereto. For example, the testing device may be configured as several devices to perform its functions.

A method for testing the object detector based on the CNN using the image concatenation by using the testing device 200 in accordance with one example embodiment of the present disclosure is described by referring to FIG. 6 as follows. In the description below, the part easily deducible from the learning method described by referring to FIGS. 1 to 4 will be omitted.

First, on condition that at least part of parameters of an FC layer 225, a convolutional layer 222, and an RPN 223 has been learned according to the learning method described by referring to FIGS. 1 to 4, if the test image is inputted, the testing device 200 may instruct a target region estimating network 221 to search for the first target region for testing to the n-th target region for testing, corresponding to at least one area where the target objects for testing are estimated as located, on the test image or its resized images.

Herein, the first target region for testing to the n-th target region for testing may correspond to multiple different target objects for testing among the target objects for testing in a same test image, or correspond to an identical target object for testing among the target objects for testing in multiple images with different sizes. Also, the first target region for testing to the n-th target region for testing may correspond to the target objects for testing estimated as located in each of images among the image pyramid including different sizes of a same image.

That is, the target region estimating network 221 may search for the first target region for testing to the n-th target region for testing, corresponding to areas where the first target object for testing to the n-th target object for testing are estimated as located, on the test image, or may search for each of the first target region for testing to the n-th target region for testing, corresponding to areas where at least one specific target object for testing is estimated as located, on each of a first resized image for testing to an n-th resized image for testing which are derived by resizing the test image. Also, the target region estimating network 221 may search for a specific target region for testing, corresponding to a specific area where a single target object for testing is estimated as located, on the test image, and may search for each of the first target region for testing to the n-th target region for testing, corresponding to the specific area where the single target object for testing is estimated as located, on each of a first resized image for testing to an n-th resized image for testing which are derived by resizing the test image. Additionally, if there are multiple target objects for testing on the test image, the target regions for testing corresponding to the target objects for testing may be estimated for each of the resized images.

Next, the testing device 200 may instruct the image-manipulating network 211 to generate a first manipulated image for testing to an n-th manipulated image for testing, corresponding to the first target region for testing to the n-th target region for testing, on the test image or its resized images each of which corresponds to each of the first target region for testing to the n-th target region for testing set by the target region estimating network 221.

Herein, the testing device 200 may instruct the image-manipulating network 211 to generate the first manipulated image for testing to the n-th manipulated image for testing by cropping one or more regions corresponding to the first target region for testing to the n-th target region for testing on the test image or its resized images, or may instruct the image-manipulating network 211 to generate the first manipulated image for testing to the n-th manipulated image for testing by cropping and resizing one or more regions corresponding to the first target region for testing to the n-th target region for testing on the test image or its resized images.

Then, the testing device 200 may instruct the image-manipulating network 211 to generate the integrated test image by concatenating the first manipulated image for testing to the n-th manipulated image for testing.

Herein, the testing device 200 may instruct the image-manipulating network 211 to adjust at least one of widths and lengths of the first manipulated image for testing to the n-th manipulated image for testing to be identical, and concatenate the first adjusted manipulated image for testing to the n-th adjusted manipulated image for testing in a direction of the widths or the lengths which are adjusted to be identical.

Then, the testing device 200 may instruct the image-manipulating network 211 to add at least one zero padding region in-between each pair comprised of two neighboring adjusted manipulated images for testing which are concatenated, among the first adjusted manipulated image for testing to the n-th adjusted manipulated image for testing. Herein, the integrated test image may be reduced by a ratio of 1/S by the multiple convolution operations of the convolutional layers, and if a maximum size of each kernel of each of the convolutional layers is K×K, a distance in-between said each pair of the two neighboring adjusted manipulated images for testing may be determined as $$S \times \frac{(K-1)}{2}.$$

Next, the testing device 200 may instruct the convolutional layer 222 to apply the convolution operations to the integrated test image, to thereby generate at least one integrated feature map for testing. Herein, the convolutional layer 222 may be a single convolutional layer or multiple convolutional layers.

Then, the testing device 200 may instruct an RPN 223 to generate one or more first object proposals for testing to one or more n-th object proposals for testing corresponding to the objects for testing in the first manipulated image for testing to the n-th manipulated image for testing included in the integrated test image by using the integrated feature map for testing.

Herein, each of the first object proposals for testing to the n-th object proposals for testing may include information on each proposal box for testing having location information corresponding to each of the objects for testing, i.e., a tagged area and information on whether it is an object.

Then, the testing device 200 may instruct a pooling layer 224 to apply the pooling operations to each region, corresponding to each of the first object proposals for testing to the n-th object proposals for testing, on the integrated feature map for testing, to thereby generate at least one pooled integrated feature map for testing, and may instruct the FC layer 225 to apply the fully connected operation to the pooled integrated feature map for testing, to thereby generate first object detection information for testing to n-th object detection information for testing corresponding to the objects for testing.

Herein, the first object detection information for testing to the n-th object detection information for testing may include information on bounding boxes, i.e., location information on each of the objects for testing, and class information on each of the objects for testing corresponding to the first object proposals for testing to the n-th object proposals for testing.

By using the method above, the objects with various sizes on the test image, especially the objects in the long distance which are small-sized, are detected efficiently. Also, computational load is reduced since only regions corresponding to the target regions acquired are used, and thus computing time of the object detector based on the CNN is reduced.

Also, in the description so far, it is assumed that there is just one target object on the test image, however, in case there are multiple target objects on the test image, detection of each of the target objects is possible by using each target region corresponding to each of the target objects on the test image as in the method mentioned above.

The present disclosure has an effect of effectively detecting the objects on the image without regard to their sizes.

The present disclosure has another effect of detecting the objects on the image without additional computational load.

The present disclosure has still another effect of efficiently detecting the objects and reducing computational time of the CNN, by using target regions corresponding to objects with various sizes.

The CNN is adaptable to customers' requirements such as KPI, i.e., key performance index. That is, the CNN can be redesigned when scales of objects change as a focal length or a resolution changes depending on the KPI. By using such CNN, hardware can be optimized with throughput improvement.

In accordance with the present disclosure, the object detector with hardware optimization based on a CNN for detection at distance or military purpose using an image concatenation is achieved.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning parameters of an object detector based on a CNN using an image concatenation, comprising steps of:
    (a) a learning device, if at least one training image is acquired, (i) instructing a target region estimating network to estimate a first target region to an n-th target region on the training image or its one or more resized images, wherein one or more corresponding target objects are estimated as located on each of the first target region to the n-th target region, (ii) instructing an image-manipulating network to generate a first manipulated image to an n-th manipulated image, from the training image or its resized images, each of which corresponds to each of the first target region to the n-th target region, and (iii) generating an integrated training image by concatenating the first manipulated image to the n-th manipulated image;
    (b) the learning device (i) instructing one or more convolutional layers to generate at least one integrated feature map by applying one or more convolution operations to the integrated training image, (ii) instructing an RPN to generate each of first object proposals to n-th object proposals, corresponding to one or more objects, in each of the first manipulated image to the n-th manipulated image by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the objects; and
    (c) the learning device instructing at least one FC loss layer to generate one or more first FC losses to one or more n-th FC losses by referring to the first object detection information to the n-th object detection information and their corresponding GTs, to thereby adjust at least part of parameters of the FC layer and the convolutional layers by backpropagating the first FC losses to the n-th FC losses.

2. The method of claim 1, wherein, after the step of (b), the learning device instructs at least one RPN loss layer to generate one or more first RPN losses to one or more n-th RPN losses by referring to the first object proposals to the n-th object proposals and their corresponding GTs, to thereby adjust at least part of parameters of the RPN by backpropagating the first RPN losses to the n-th RPN losses.

3. The method of claim 1, wherein, at the step of (a), the learning device instructs the image-manipulating network to adjust at least one of widths and lengths of the first manipulated image to the n-th manipulated image to be identical, and concatenates the first adjusted manipulated image to the n-th adjusted manipulated image in a direction of the widths or the lengths which are adjusted to be identical.

4. The method of claim 3, wherein the learning device instructs the image-manipulating network to add at least one zero padding region in-between each pair comprised of two neighboring adjusted manipulated images which are concatenated, among the first adjusted manipulated image to the n-th adjusted manipulated image.

5. The method of claim 4, wherein the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as $$S \times \frac{(K-1)}{2}.$$

6. The method of claim 1, wherein, at the step of (a), the learning device instructs the target region estimating network to calculate each scale histogram for each of the training image or its resized images and estimate the first target region to the n-th target region corresponding to scale proposals where the corresponding target objects are estimated as located, by referring to the scale histogram.

7. The method of claim 1, wherein, at the step of (a), the learning device instructs the image-manipulating network to generate the first manipulated image to the n-th manipulated image by cropping one or more regions corresponding to the first target region to the n-th target region on the training image or its resized images, or instructs the image-manipulating network to generate the first manipulated image to the n-th manipulated image by cropping and resizing one or more regions corresponding to the first target region to the n-th target region on the training image or its resized images.

8. The method of claim 1, wherein the first target region to the n-th target region correspond to multiple different target objects among the target objects in the training image, or correspond to at least one identical target object in the training image and its resized images.

9. A method for testing an object detector based on a CNN using an image concatenation, comprising steps of:
(a) on condition that a learning device (1) (i) has instructed a target region estimating network to estimate a first target region for training to an n-th target region for training on at least one training image or its one or more resized images for training, wherein one or more corresponding target objects for training are estimated as located on each of the first target region for training to the n-th target region for training, (ii) has instructed an image-manipulating network to generate a first manipulated image for training to an n-th manipulated image for training, from the training image or its resized images for training, each of which corresponds to each of the first target region for training to the n-th target region for training, and (iii) has generated an integrated training image by concatenating the first manipulated image for training to the n-th manipulated image for training, (2) (i) has instructed one or more convolutional layers to generate at least one integrated feature map for training by applying one or more convolution operations to the integrated training image, (ii) has instructed an RPN to generate each of first object proposals for training to n-th object proposals for training, corresponding to one or more objects for training, in each of the first manipulated image for training to the n-th manipulated image for training by using the integrated feature map for training, (iii) has instructed a pooling layer to apply one or more pooling operations to each region, corresponding to each of the first object proposals for training to the n-th object proposals for training, on the integrated feature map for training, to thereby generate at least one pooled integrated feature map for training, and (iv) has instructed an FC layer to apply at least one fully connected operation to the pooled integrated feature map for training, to thereby generate first object detection information for training to n-th object detection information for training corresponding to the objects for training, and (3) has instructed at least one FC loss layer to generate one or more first FC losses to one or more n-th FC losses by referring to the first object detection information for training to the n-th object detection information for training and their corresponding GTs, to thereby adjust at least part of parameters of the FC layer and the convolutional layers by back-propagating the first FC losses to the n-th FC losses; a testing device, if at least one test image is acquired, (i) instructing the target region estimating network to estimate a first target region for testing to an n-th target region for testing on the test image or its one or more resized images for testing, wherein one or more corresponding target objects for testing are estimated as located on each of the first target region for testing to the n-th target region for testing, (ii) instructing the image-manipulating network to generate a first manipulated image for testing to an n-th manipulated image for testing, from the test image or its resized images for testing, each of which corresponds to each of the first target region for testing to the n-th target region for testing, and (iii) generating an integrated test image by concatenating the first manipulated image for testing to the n-th manipulated image for testing; and
(b) the testing device (i) instructing the convolutional layers to generate at least one integrated feature map for testing by applying the convolution operations to the integrated test image, (ii) instructing the RPN to generate each of first object proposals for testing to n-th object proposals for testing, corresponding to one or more objects for testing, in each of the first manipulated image for testing to the n-th manipulated image for testing by using the integrated feature map for testing, (iii) instructing the pooling layer to apply the pooling operations to each region, corresponding to each of the first object proposals for testing to the n-th object proposals for testing, on the integrated feature map for testing, to thereby generate at least one pooled integrated feature map for testing, and (iv) instructing the FC layer to apply the fully connected operation to the pooled integrated feature map for testing, to thereby generate first object detection information for testing to n-th object detection information for testing corresponding to the objects for testing.

10. The method of claim 9, wherein, at the step of (a), the testing device instructs the image-manipulating network to adjust at least one of widths and lengths of the first manipulated image for testing to the n-th manipulated image for testing to be identical, and concatenates the first adjusted manipulated image for testing to the n-th adjusted manipulated image for testing in a direction of the widths or the lengths which are adjusted to be identical.

11. The method of claim 10, wherein the testing device instructs the image-manipulating network to add at least one zero padding region in-between each pair comprised of two neighboring adjusted manipulated images for testing which are concatenated, among the first adjusted manipulated image for testing to the n-th adjusted manipulated image for testing.

12. The method of claim 11, wherein the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as $$S \times \frac{(K-1)}{2}.$$

13. The method of claim 9, wherein, at the step of (a), the testing device instructs the target region estimating network to calculate each scale histogram for testing for each of the test image or its resized images for testing and estimate the first target region for testing to the n-th target region for testing corresponding to scale proposals where the corresponding target objects for testing are estimated as located, by referring to the scale histogram for testing.

14. The method of claim 9, wherein, at the step of (a), the testing device instructs the image-manipulating network to generate the first manipulated image for testing to the n-th manipulated image for testing by cropping one or more regions corresponding to the first target region for testing to the n-th target region for testing on the test image or its resized images for testing, or instructs the image-manipulating network to generate the first manipulated image for testing to the n-th manipulated image for testing by cropping and resizing one or more regions corresponding to the first target region for testing to the n-th target region for testing on the test image or its resized images for testing.

15. The method of claim 9, wherein the first target region for testing to the n-th target region for testing correspond to multiple different target objects for testing among the target objects for testing in the test image, or correspond to at least one identical target object for testing in the test image and its resized images for testing.

16. A learning device for learning parameters of an object detector based on a CNN using an image concatenation, comprising:
at least one memory that stores instructions; and
at least one processor configured to execute the instructions to: perform processes of (I) (i) instructing a target region estimating network to estimate a first target region to an n-th target region on at least one training image or its one or more resized images, wherein one or more corresponding target objects are estimated as located on each of the first target region to the n-th target region, (ii) instructing an image-manipulating network to generate a first manipulated image to an n-th manipulated image, from the training image or its resited images, each of which corresponds to each of the first target region to the n-th target region, and (iii) generating an integrated training image by concatenating the first manipulated image to the n-th manipulated image, (II) (i) instructing one or more convolutional layers to generate at least one integrated feature map by applying one or more convolution operations to the integrated training image, (ii) instructing an RPN to generate each of first object proposals to n-th object proposals, corresponding to one or more objects, in each of the first manipulated image to the n-th manipulated image by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the objects, and (III) instructing at least one FC loss layer to generate one or more first FC losses to one or more n-th FC losses by referring to the first object detection information to the n-th object detection information and their corresponding GTs, to thereby adjust at least part of parameters of the FC layer and the convolutional layers by backpropagating the first FC losses to the n-th FC losses.

17. The learning device of claim 16, wherein, after the process of (II), the processor instructs at least one RPN loss layer to generate one or more first RPN losses to one or more n-th RPN losses by referring to the first object proposals to the n-th object proposals and their corresponding GTs, to thereby adjust at least part of parameters of the RPN by backpropagating the first RPN losses to the n-th RPN losses.

18. The learning device of claim 16, wherein, at the process of (I), the processor instructs the image-manipulating network to adjust at least one of widths and lengths of the first manipulated image to the n-th manipulated image to be identical, and concatenates the first adjusted manipulated image to the n-th adjusted manipulated image in a direction of the widths or the lengths which are adjusted to be identical.

19. The learning device of claim 18, wherein the processor instructs the image-manipulating network to add at least one zero padding region in-between each pair comprised of two neighboring adjusted manipulated images which are concatenated, among the first adjusted manipulated image to the n-th adjusted manipulated image.

20. The learning device of claim 19, wherein the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as $$S \times \frac{(K-1)}{2}.$$

21. The learning device of claim 16, wherein, at the process of (I), the processor instructs the target region estimating network to calculate each scale histogram for each of the training image or its resized images and estimate the first target region to the n-th target region corresponding to scale proposals where the corresponding target objects are estimated as located, by referring to the scale histogram.

22. The learning device of claim 16, wherein, at the process of (I), the processor instructs the image-manipulating network to generate the first manipulated image to the n-th manipulated image by cropping one or more regions corresponding to the first target region to the n-th target region on the training image or its resized images, or instructs the image-manipulating network to generate the first manipulated image to the n-th manipulated image by cropping and resizing one or more regions corresponding to the first target region to the n-th target region on the training image or its resized images.

23. The learning device of claim 16, wherein the first target region to the n-th target region correspond to multiple different target objects among the target objects in the training image, or correspond to at least one identical target object in the training image and its resized images.

24. A testing device for testing an object detector based on a CNN using an image concatenation, comprising:
at least one memory that stores instructions; and
at least one processor, on condition that a learning device (1) (i) has instructed a target region estimating network to estimate a first target region for training to an n-th target region for training on at least one training image or its one or more resized images for training, wherein one or more corresponding target objects for training are estimated as located on each of the first target region for training to the n-th target region for training, (ii) has instructed an image-manipulating network to generate a first manipulated image for training to an n-th manipulated image for training, from the training image or its resized images for training, each of which corresponds to each of the first target region for training to the n-th target region for training, and (iii) has generated an integrated training image by concatenating the first manipulated image for training to the n-th manipulated image for training, (2) (i) has instructed one or more convolutional layers to generate at least one integrated feature map for training by applying one or more convolution operations to the integrated training image, (ii) has instructed an RPN to generate each of first object proposals for training to n-th object proposals for training, corresponding to one or more objects for training, in each of the first manipulated image for training to the n-th manipulated image for training by using the integrated feature map for training, (iii) has instructed a pooling layer to apply one or more pooling operations to each region, corresponding to each of the first object proposals for training to the n-th object proposals for training, on the integrated feature map for training, to thereby generate at least one pooled integrated feature map for training, and (iv) has instructed an FC layer to apply at least one fully connected operation to the pooled integrated feature map for training, to thereby generate first object detection information for training to n-th object detection information for training corresponding to the objects for training, and (3) has instructed at least one FC loss layer to generate one or more first FC losses to one or more n-th FC losses by referring to the first object detection information for training to the n-th object detection information for training and their corresponding GTs, to thereby adjust at least part of parameters of the FC layer and the convolutional layers by backpropagating the first FC losses to the n-th FC losses; configured to execute the instructions to: perform processes of (I) (i) instructing the target region estimating network to estimate a first target region for testing to an n-th target region for testing on at least one test image or its one or more resized images for testing, wherein one or more corresponding target objects for testing are estimated as located on each of the first target region for testing to the n-th target region for testing, (ii) instructing the image-manipulating network to generate a first manipulated image for testing to an n-th manipulated image for testing, from the test image or its resized images for testing, each of which corresponds to each of the first target region for testing to the n-th target region for testing, and (iii) generating an integrated test image by concatenating the first manipulated image for testing to the n-th manipulated image for testing, and (II) (i) instructing the convolutional layers to generate at least one integrated feature map for testing by applying the convolution operations to the integrated test image, (ii) instructing the RPN to generate each of first object proposals for testing to n-th object proposals for testing, corresponding to one or more objects for testing, in each of the first manipulated image for testing to the n-th manipulated image for testing by using the integrated feature map for testing, (iii) instructing the pooling layer to apply the pooling operations to each region, corresponding to each of the first object proposals for testing to the n-th object proposals for testing, on the integrated feature map for testing, to thereby generate at least one pooled integrated feature map for testing, and (iv) instructing the FC layer to apply the fully connected operation to the pooled integrated feature map for testing, to thereby generate first object detection information for testing to n-th object detection information for testing corresponding to the objects for testing.

25. The testing device of claim 24, wherein, at the process of (I), the processor instructs the image-manipulating network to adjust at least one of widths and lengths of the first manipulated image for testing to the n-th manipulated image for testing to be identical, and concatenates the first adjusted manipulated image for testing to the n-th adjusted manipulated image for testing in a direction of the widths or the lengths which are adjusted to be identical.

26. The testing device of claim 25, wherein the processor instructs the image-manipulating network to add at least one zero padding region in-between each pair comprised of two neighboring adjusted manipulated images for testing which are concatenated, among the first adjusted manipulated image for testing to the n-th adjusted manipulated image for testing.

27. The testing device of claim 26, wherein the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as $$S \times \frac{(K-1)}{2}.$$

28. The testing device of claim 24, wherein, at the process of (I), the processor instructs the target region estimating network to calculate each scale histogram for testing for each of the test image or its resized images for testing and estimate the first target region for testing to the n-th target region for testing corresponding to scale proposals where the corresponding target objects for testing are estimated as located, by referring to the scale histogram for testing.

29. The testing device of claim 24, wherein, at the process of (I), the processor instructs the image-manipulating network to generate the first manipulated image for testing to the n-th manipulated image for testing by cropping one or more regions corresponding to the first target region for testing to the n-th target region for testing on the test image or its resized images for testing, or instructs the image-manipulating network to generate the first manipulated image for testing to the n-th manipulated image for testing by cropping and resizing one or more regions corresponding to the first target region for testing to the n-th target region for testing on the test image or its resized images for testing.

30. The testing device of claim 24, wherein the first target region for testing to the n-th target region for testing correspond to multiple different target objects for testing among the target objects for testing in the test image, or correspond to at least one identical target object for testing in the test image and its resized images for testing.

* * * * *